United States Patent [19]
Scola

[11] 4,007,245
[45] Feb. 8, 1977

[54] STRENGTHENING OF FIBER GLASS REINFORCED EPOXY RESIN COMPOSITES BY VACUUM HEAT TREATMENT
[75] Inventor: Daniel A. Scola, Glastonbury, Conn.
[73] Assignee: The United States of America as represented by the Secretary of the Army, Washington, D.C.
[22] Filed: June 3, 1975
[21] Appl. No.: 583,813
[52] U.S. Cl. .................................. 264/101; 264/36; 264/102; 264/344; 156/94
[51] Int. Cl.$^2$ .......................................... B29C 25/00
[58] Field of Search .............. 264/36, 39, 101, 102, 264/234, 236, 345, 346, 347, 344; 156/94

[56] References Cited
UNITED STATES PATENTS

| | | | |
|---|---|---|---|
| 3,029,473 | 4/1962 | Greenberg | 264/346 |
| 3,047,909 | 8/1962 | Boyer | 264/345 |

OTHER PUBLICATIONS
"Glass Fibre and Glass to Resin Adhesion," by K. J. Brookfield, *Reinforced Plastics*, (London), vol. 27, No. 299, pp. 135–138, (9/62).
"The Effect of Heat & Water Immersion on the Flexural Strength of Certain Glass Fibre/Polyester Resin Laminates," by H. J. Brookfield, *Applied Plastics*, Apr. 1959, pp. 29–31 and May 1959, pp. 41–44.

*Primary Examiner*—Robert F. White
*Assistant Examiner*—James B. Lowe
*Attorney, Agent, or Firm*—Nathan Edelberg; Robert P. Gibson; Jack W. Voigt

[57] ABSTRACT

Method of improving the shear strength properties of degraded fibrous/resin composites comprising subjecting the composite article to a vacuum heat treatment. The vacuum heat treatment of the degraded composite article regenerates the bond at the fibrous/resin interface, causing a regain in shear strength. The treatment comprises subjecting the composite to a pressure of about 1 millimeter of mercury at a temperature of 300° F (149° C) for 24 hours.

1 Claim, No Drawings

STRENGTHENING OF FIBER GLASS REINFORCED EPOXY RESIN COMPOSITES BY VACUUM HEAT TREATMENT

DEDICATORY CLAUSE

The invention described herein was made in the course of or under a contract or subcontract thereunder with the Government; therefore, the invention described herein may be manufactured, used, and licensed by or for the Government for governmental purposes without the payment to me of any royalties thereon.

BACKGROUND OF THE INVENTION

Fibrous/resin composites have been widely utilized in the aerospace field and in the rocket and missile field. Particularly in the rocket and missile field where high volume use of tube launched rocket motors has been the requirement, special research has been focused to the problem of degradation, particularly, glass fiber-/epoxy resin composites. Although many improvements have resulted from research and development work in the area of moisture resistant S-glass fibers, a need exists for regenerating glass fiber/epoxy resin composites after degradation occurs.

A common approach used to improve the shear strength of fiber reinforced epoxy resin composites is to treat the glass fiber surface with a finish containing various components which improve the adhesion between fiber surface and resin matrix. This approach has been used in the original manufacturing process to yield composites which have a much greater resistance to attack from polar and nonpolar solvents. However, when the composites are exposed to high humidity conditions and atmospheric moisture, degradation occurs when water or other polar compounds are absorbed.

Advantageous would be a method for post manufactured strengthening of fibrous reinforced resin composites.

A method for strengthening fibrous reinforced resin composites which have undergone degradation from exposure to polar compounds would be highly desirable since the degraded composite could be strengthened and returned to a usable condition.

Therefore, an object of this invention is to provide a method for strengthening fibrous reinforced resin composites by improving the shear strength properties of post manufactured composites.

Another object of this invention is to provide a method of improving the shear strength properties of fibrous reinforced resin composites which have undergone degradation from exposure to polar compounds.

SUMMARY OF THE INVENTION

Treatment of the already formed fibrous/resin composite article by a method which includes heating in a vacuum system improves the shear strength of the composite article. The process causes a regeneration of the shear strength of the composites which have been degraded by exposure to room temperature water or methanol or boiling water or methanol. The method includes heating the article in a vacuum (~1 mm of mercury) for 24 hours at 300° ± 10° F).

DESCRIPTION OF THE PREFERRED EMBODIMENT

A composite article manufactured from a fibrous/resin has certain values of the shear strength properties. The shear strength property value is dependent upon the conditions of fibrous/resin interface. It has been discovered that interface degradation results in a loss of shear strength properties.

A method has been discovered which is effective in restoring loss of shear strength properties resulting from exposure to water and other polar compounds. The method comprises placing a formed fibrous/resin composite article in a container that is provided with means for evacuating and means for heating and subjecting the composite article of the fibrous/resin to vacuum (~1 mm Hg) treatment at 300° F for a period of about 24 hours and thereafter, allowing to cool to ambient temperature. The disclosed temperature, time and vacuum is sufficient to remove the layer of polar compound (generally moisture, or other polar compounds such as alcohols) which attributes to the loss of shear strength properties. Apparently with the removal of the layer of polar compound from the interface, stronger interaction between fiber and resin develops, and consequently, improves shear strength. An additional cycle can be repeated, if required, until constant weight is obtained which indicates that the absorbed polar compound has been removed and the shear strength of the composite article has been restored to its maximum value. An additional valid test for determining if maximum shear strength has been restored or if the absorbed polar compound is completely removed is by infrared studies. The infrared studies of water and solvent exposed resin specimens are consistent with weight and mechanical property data of composites. These results show that water and solvents cause physical changes in the resin and further suggest that the principal cause of composite shear strength from these exposures is debonding or weakening of the fiber-resin interface.

Some properties of neat resin and composites are listed in Tables I and II below. Table I lists some properties of neat epoxy resins. Table II lists some properties of S-glass/epoxy resin composite shear specimens (epoxy coated).

TABLE I

| SOME PROPERTIES OF EPOXY RESINS | | |
|---|---|---|
| | ERL 2256-0820 | ERX-67/MDA |
| Density, g/cc | 1.20 | 1.32 |
| Tensile strength (ASTM-D657), psi, (MN/m$^2$) | 9200 (63.4) | 4761 (32.5) |
| modulus, 10$^6$psi, (GM/m$^2$) | 0.66 (4.55) | 0.70 (4.82) |
| elongation % | 1.6 | 0.84 |
| Flexural strength (ASTM-D790) psi, (MN/m$^2$) | 14,315 (98.8) | 9490 (65.5) |
| modulus,10$^6$psi, (GN/m$^2$) | 0.63 (4.03) | 0.72 (4.96) |
| Tensile strength (ASRM-D657) after 24 hrs boiling water, psi, (MN/m$^2$) | 8045 (55.3) | 2755 (19.1) |
| modulus after 24 hrs boiling water | | |

TABLE I-continued

SOME PROPERTIES OF EPOXY RESINS

|  | ERL 2256-0820 | ERX-67/MDA |
|---|---|---|
| $10^6$, psi, (GM/m$^2$) | 0.66 (4.55) | 0.68 (4.68) |
| % elongation after 24 hrs boiling water | 1.6 | 0.44 |
| Moisture absorption, wt %, 95% RH, 120° F, 8 weeks | 0.95 | 0.60 |
| Moisture absorption, wt %, boiling water, 24 hrs | 1.79 | 0.37 |
| Tg ° F (ASTM-D696) | 242 | 256 |
| HDT ° F (ASTM D-648) | 257 | 273 |

TABLE II

SOME PROPERTIES OF S-GLASS/EPOXY RESIN COMPOSITE SHEAR SPECIMENS (EPOXY COATED)

| Composite System | Fiber Vol % | Resin Vol % | Void Vol % | Density g/cc | Short Beam Shear Strength[1] | | | | | | | |
|---|---|---|---|---|---|---|---|---|---|---|---|---|
|  |  |  |  |  | Dry[2] | | Wet[3] | | 95% RH[4] | | EWB[5] | |
|  |  |  |  |  | psi | MN/m$^2$ | psi | MN/m$^2$ | psi | MN/m$^2$ | psi | MN/m$^2$ |
| Ferro S-glass S-24 finish/2256-0820, No. 110 | 52.4 | 47.2 | 0.38 | 1.88 | 13,380 | 92.3 | 10,855 | 92.5 | 10,880 | 75.0 | 8950 | 62.7 |
| Owens Corning S-glass-HTS finish/2256-0820 No. 107 | 50.0 | 49.1 | 0.85 | 1.85 | 12,900 | 89.0 | 11,200 | 77.2 | 11,650 | 80.5 | 9200 | 63.4 |
| Ferro S-glass S-24 finish/ERX-67-MDA, No. 118 | 56.5 | 43.4 | 0 | 2.17 | 14,940 | 103.0 | 12,150 | 83.7 | 14,250 | 98.5 | 7330 | 50.6 |

[1]S/D = 5/1
[2]Dry - tested at RT 2 to 3 weeks after fabrication
[3]Wet - tested at RT after 24 hrs boiling water exposure
[4]95% RH - tested at RT after 95% relative humidity at 120° F for 8 weeks
[5]EWB - tested at RT after moisture absorption by the sample in boiling water reached a constant level. 312 hrs for composites 107 and 110; 288 hrs for composite 118.

Tables III and IV below illustrate conditions of exposure and measurements of shear strength, percent loss in shear strength after exposure to polar compounds and/or high humidity conditions, and the percent regain in shear strength when subjected to evacuation to about 1 mm Hg and heat treatment at about 300° F.

TABLE III

UNIDIRECTIONAL FERRO S-GLASS/2256-0820 EPOXY RESIN COMPOSITES

| Treatment | Short Beam Shear Strength | % Loss in Shear Strength | % Regain in Shear Strength |
|---|---|---|---|
| Untreated | 13,150 | — | — |
| Evacuated, 24 hrs at 300° F | 14,825 | — | 13.0 |
| 95% RH*, 120° F, 8 wks | 11,250 | 14.5 | — |
| 95% RH, 120° F, 8 wks + evac** | 14,500 | — | 24.8 |
| Water, RT***, 1 wk | 13,400 | — | — |
| Water, RT, 1 wk + evac | 15,150 | — | 13.4 |
| BW**** 24 hrs | 11,100 | 15.6 | — |
| BW 24 hrs + evac | 13,750 | — | 20.1 |
| BW (312 hrs) | 10,170 | 22.3 | — |
| BW (312 hrs) + evac | 13,075 | — | 21.7 |

*relative humidity
**heat treatment in a vacuum (~1 mm Hg) for 24 hrs at 300° F
***room temperature
****boiling water

TABLE IV

UNIDIRECTIONAL OWENS-CORNING S-GLASS/2256-0820 EPOXY RESIN COMPOSITES

| Treatment | Short Beam Shear Strength psi | % Loss in Shear Strength | % Regain in Shear Strength |
|---|---|---|---|
| Untreated | 12,200 | — | — |
| Evacuated 24 hrs at 300° F | 13,490 | — | 10.5 |
| 95% RH*, 120° F, 8 wks | 11,400 | 6.5 | — |
| 95% RH, 120° F, 8 wks + evac** | 13,000 | — | 13.0 |
| Water, RT***, 1 wk | 12,475 | — | — |
| Water, RT, 1 wk + evac | 13,750 | — | 12.7 |
| BW****, 24 hrs | 11,200 | 8.2 | — |
| BW, 24 hrs + evac | 13,375 | — | 17.9 |
| BW (312 hrs) | 11,050 | 9.4 | — |
| BW (312 hrs) + evac | 12,680 | — | 13.3 |
| Methanol, RT, 48 hrs | 12,120 | 0.60 | — |
| Methanol, RT, 48 hrs + evac | 13,350 | — | 9.5 |
| Methanol, boiling 48 hrs | 9,680 | 20.0 | — |

TABLE IV-continued
UNIDIRECTIONAL OWENS-CORNING S-GLASS/2256-0820 EPOXY RESIN COMPOSITES

| Treatment | Short Beam Shear Strength psi | % Loss in Shear Strength | % Regain in Shear Strength |
|---|---|---|---|
| Methanol, boiling 48 hrs + evac | 12,325 | — | 21.0 |

*relative humidity
**heat treatment in a vacuum (~1 mm Hg) for 24 hrs at 300° F
***room temperature
****boiling water The data in Tables III and IV illustrates the degradation affect to the strength properties of S-glass/resin composites. Unidirectional glass fiber/resin composites and resins used as matrices in these composites were exposed to several environments to determine loss of shear strength. In all cases the loss of shear strength can be recovered by heat treatment in a vacuum for 24 hours at 300° F.

The composite Ferro S-glass/2256-0820 Epoxy Resin of Table III is comprised of Ferro 961-S-glass and ERL 2256-0820 resin. The resin is a cycloaliphatic/bisphenol A blend epoxy cured with aromatic amine. The composite of Table IV is comprised of Ownes-Corning 901-S-glass and the resin used in the composite of Table III.

The effects of a polar molecule like methanol on ERL 2256/0820 behavior are similar to those caused by water but to a greater extent. For example, exposure of the resin to methanol at room temperature for 48 hours causes a 2.6 percent increase in resin weight and about a 35 percent decrease in flexural strength. Evacuation removes the methanol, but does not change the flexural properties. Boiling methanol causes a 13.5 percent increase in weight due to methanol absorption and about a 50 percent decrease in flexural strength. The evacuation does recover some of the strength and stiffness properties. The absorbed methanol and apparently other components are removed by this process since the weight changes becomes −1.18 instead of −0.68, as in the control sample.

At room temperature and at its boiling point, methanol appears to interact with the resin by two methods: (1) absorption by the resin, and (2) dissolution of components of the resin. In both cases, the flexural strengths are decreased, but the moduli remain fairly constant.

The method of this invention comprises placing the glass fiber/resin composite article that has been subjected to degradation by a polar compound in a vacuum oven or other suitable container that is provided with means for heating and controlling the temperature at about 300° F and means for evacuating and holding under a vacuum of about 1 mm Hg for a period of time of about 24 hours.

The effectiveness of the method of this invention is evaluated by subjecting the composite and resin specimens to the conditions set forth in Tables III and IV. The composites are cut into shear specimens, some shear specimens are coated with the matrix resin, others are studied in the uncoated state so that the fiber ends are exposed. The shear specimens are cut for short beam shear strength measurement. Resin specimens are prepared and cut in flexural specimens, heat distortion specimens, and coefficient of thermal expansion specimens (for Tg determination; Tg means glass transition temperature). Both composite samples were evaluated after exposure by making physical properties measurements and comparing the results.

The results of composite exposure to boiling water or high humidity for those composites made from roving glass fiber with experimental finishes were compared to those composites made from roving glass fiber with commercial finishes and epoxy resin. The following observations with experimental finishes are made:

1. Composites with high wet strength absorb essentially the same quantity of water after 24 hour water boil or after 8 weeks exposure to 95 percent RH at 120° F. This is true for composites containing resin matrices ERL 2256/0820 and ERX-67/MDA. ERL 2256/0820 resin is a cycloaliphatic/bisphenol A blend epoxy cured with aromatic amine. ERX-67/MDA resin is a brominated diglycidylaniline (epoxy) cured with 4,4'-methylenedianiline. Composites with low wet strength behaved similarly. Study of the table of shear strength data for high wet strength and low wet strength composites show that in general the shear strength after 24 hours boiling water or after 8 weeks exposure to 95 percent RH at 120° F are essentially equivalent. This correlation of moisture absorption and shear strength retention after these two exposures strongly suggests that the 24 hour boiling water test is equivalent to 8 weeks exposure to 95 percent RH at 120° F.

2. The percent moisture absorbed by composites with either ERL 2256/0820 or ERX-67/MDA matrix is lowest for the composites which exhibited high wet strength retention, although the difference between moisture absorption by composites with high and low wet strength is very small indeed. The difference is significant, however, inasmuch as the low wet strength and low dry strength composites generally contain less resin than the high wet strength composites and would therefore be expected to absorb less moisture than composites with a greater amount of resin. From these observations, it appears that moisture absorption and shear strength are related. Since the shear strength is decreased either by 24 hour boiling water or 95 percent relative humidity exposure, it appears that moisture absorption occurs both in the resin matrix and in the interface. For those composites which absorbed a greater quantity of moisture after boiling water or 95 percent relative humidity exposures even though the resin content is low, it is apparent that a disproportionate amount of water is absorbed by the interface; the wet shear strength in these composites is very poor.

3. Composites in all strength categories which have been exposed to boiling water until equilibrium moisture uptake is achieved (EWB), absorb equivalent quantities of water. Since there are wide differences in the shear strength after EWB, it appears that those composites which are weaker in shear absorbed more moisture at the interface than those composites which are stronger in shear.

4. Composites containing resin matrix ERX-67/MDA absorb less moisture due to 24 hour boiling water or 95 percent RH exposures than composites containing resin matrix ERL 2256/0820. However, composites containing resin matrix ERX-67/MDA absorb more moisture due to EWB than composites containing ERL 2256/0820.

5. Several composites required boiling for 504 hours to reach equilibrium water boil (EWB). This is a long term exposure under these conditions, so selected composites were compared to these by continued boiling past EWB until the composite has been exposed for 504 hours. The results reveal that continued boiling water exposure beyond EWB does not cause further reductions in shear strength, providing the resin matrix is ERL 2256/0820. In fact, most composites containing this resin show an increase in shear strength compared with the EWB value. Most composites containing resin matrix ERX-67/MDA continue to lose shear strength on long time exposure to boiling water.

The following observations for commercial finishes are made:

1. The data reveal that irrespective of the resin system, Owens-Corning S-glass/resin composites absorb less moisture due to exposure to 24 hour water boil than Ferro S-glass/resin composites. This suggests that the interface in the composites containing Ferro S-glass is absorbing a greater quantity of moisture. The data further reveal that in general the wet strength and strength retention of Ferro S-glass/resin composites is inferior to the OC S-glass composites, further suggesting that the interface in the former composites is being degraded by moisture.

2. Humidity effects over a 16 to 19 week period for composites containing the commercial rovings show that the OC S-glass/resin composites have better shear strength initially and after exposure than the Ferro S-glass composites. Composites containing ERL 2256/0820 epoxy resin fell off very gradually in shear strength over the 16 week exposure period, while composites containing ERX-67/MDA retained 100 percent of the initial dry strength and in the case of the OC roving, appear to increase in shear strength. However, the ERX-67/MDA resin composites experienced a much greater distribution of shear strength over this time period than composites containing ERL 2256/0820, indicating erratic and less reliable performance.

3. Composites containing resin matrix ERX-67/MDA absorb less moisture due to 24 hour boiling water or 95 percent RH exposures than composites containing resin matrix ERL 2256/0820. However, composites containing resin matrix ERX-67/MDA absorb more moisture due to EWB than composites containing ERL 2256/0820.

4. As was observed with composites made from experimental finishes, for composites made from commercial roving, the shear strength retentions after 24 hour water boil or 95 percent RH exposure and moisture absorption values after these two exposures are essentially the same and suggest that the 24 hour water boil test is equivalent to 8 weeks exposure to 95 percent RH at 120° F.

5. Moisture absorption for commercial roving/epoxy resin composites over a 16 week period at 95 percent RH, 125° F shows that Ferro S-glass composites absorb more moisture than Owens-Corning S-glass composites, irrespective of the resin. It also shows that composites containing epoxy resin ERX-67/MDA absorb less moisture in this environment than ERL 2256/0820 composites. Furthermore, moisture absorption for ERX-67/MDA composites appears to level off in about 8 weeks, while 2256/0820 composites require about 12 weeks.

The above noted tests and results indicate that glass fiber/resin composites are available which resist moisture attack; however, once the moisture has penetrated the composite article to the interface a degradation occurs which readily effects the shear strength properties. The shear strength properties of the degraded composite article however, can be improved by subjecting the composite article to the vacuum heat treatment of this invention. The maximum recovery of shear strength properties is considered to have been reached when a constant weight is obtain after completing one or more cycles of treatment which comprises evacuation to about 1 mm Hg while maintaining temperature of about 300° F.

Thus, the glass fiber composite articles, particularly, articles such as glass fiber composite articles which are required to be stored for long periods of time can be recycled after the shear strength has been restored by the heat treatment of this invention. This would be especially advantageous for high volume tube launched rocket motors. The method of this invention should be useful for any glass fiber composite article which has undergone degradation from exposure to polar compounds, particularly, exposure to water or moisture which has penetrated the interface of the glass fiber-/epoxy resin composite.

The problem of loss in shear strength for the described exposures and the method to improve the shear strength is not limited to unidirectional glass fiber-/epoxy resin composites but would be suitable for improving the shear strength of glass fiber/epoxy resin composites in general and also glass fiber/various types of resin composites and more generally to fibrous/resin composites, such as graphite fiber/epoxy, boron fiber-/epoxy, alumina fiber/epoxy, silicon carbide/epoxy, kevlar/epoxy, unidirectional, multidirectional and glass cloth.

All epoxy resins such as the standard:
(a) Bisphenol type (diglycidyl ether of Bisphenol A), such as Shell's Epon 828 or 826,
(b) epoxy novalac, such as Dow's DEN 438,
(c) cycloaliphatic epoxides as Union Carbide's ERL 4617,
(d) halogenated epoxies such as Shell's ERX-67 and Shell's 1045 or Dow's DER 542, or Ciba's Araldite DP-449,
(e) blends of resins such as ERL 2256, which consists of standard bisphenol A type resin and Union Carbide's cycloaliphatic ERL 4205 or ERL 4617,
(f) Epoxy resins cured with typical aromatic amines or aromatic amine mixtures such as 4,4'-methylene-dianiline or ZZL-0820, respectively; and aliphatic or polyamide curing agents such as diethylenetriamine or Shell's polyamide V-40, respectively.

Other resin systems which apply are polyimides, such as Monsanto's Skybonds 703 or 709, Dupont's NR-150 series, Ciba-Gergy's P13N, Rhodia's Kerimid 601, 500, or 353 series, polyesters (Reichold 32-122), and Thermoplastics such as polysulfones, polyethersulfones, polyarylsulfones, polycarbonates, polyethylenes, polystryrenes, polypropylenes and polyamides, and blends of resin systems, both thermoplastics and thermosets.

I claim:

1. A method of improving the shear strength properties of a glass fiber/epoxy resin composite article that has undergone degradation from exposure to a polar compound, said method comprising:

i. Placing said glass fiber/epoxy resin composite article in a container that is provided with means for evacuating and means for heating;

ii. evacuating said container to a low pressure of about 1 mm of mercury and heating the container to a temperature of about 300° F.

iii. maintaining said pressure and said temperature for at least one cycle of operation which is about 24 hours; and thereafter, iv. allowing said composite article to cool to ambient temperature.

* * * * *